April 16, 1968  M. KOLODNEY ETAL  3,378,478

APPARATUS FOR CONTINUOUS OXYGEN MONITORING OF LIQUID METALS

Filed Feb. 20, 1963  2 Sheets-Sheet 1

INVENTORS
MORRIS KOLODNEY
HYMAN STEINMETZ

April 16, 1968   M. KOLODNEY ET AL   3,378,478
APPARATUS FOR CONTINUOUS OXYGEN MONITORING OF LIQUID METALS
Filed Feb. 20, 1963   2 Sheets-Sheet 2

INVENTORS
MORRIS KOLODNEY
HYMAN STEINMETZ
BY

United States Patent Office 3,378,478
Patented Apr. 16, 1968

---

3,378,478
APPARATUS FOR CONTINUOUS OXYGEN MONITORING OF LIQUID METALS
Morris Kolodney, River Edge, N.J., and Hyman Steinmetz, Monsey, N.Y., assignors to the United States of America as represented by the United States Atomic Energy Commission
Filed Feb. 20, 1963, Ser. No. 260,086
3 Claims. (Cl. 204—195)

This invention relates to an oxygen monitor for liquid metals and more particularly to a galvanic cell which will detect continuously the amount of oxygen present in liquid alkali metals such as sodium.

In sodium cooled nuclear reactors the presence of small amounts of oxygen is a controlling factor in corrosion and mass transfer which affect the life and safety of the reactor, as is well known in the art. Certain materials considered to be otherwise quite suitable for specific applications in a nuclear reactor, columbium, for example, are readily oxidized by the oxygen in solution, even in very small amounts such as a few p.p.m. of the oxygen.

While considerable precautions are generally taken to insure that the presence of oxygen will be kept to the barest possible minimum, it is quite apparent that during normal operation of the reactor, regular tests for the presence of oxygen should be made to insure that the level of oxygen will not increase unexpectedly to unsafe values. Furthermore, a sudden, though slight, increase in oxygen might be the first detectable indication of a failure or otherwise undetected deviation from normal operation and it would be exceedingly helpful if this increase were to be detected immediately so that corrective action can be taken before extensive damage occurs.

As a result of such need, a variety of techniques and devices have been developed over the years to measure the amount of oxygen dissolved in liquid metals. The so-called "plugging meter" which relies on cooling of a by-pass stream to precipitate out the sodium oxide to cause plugging of a flow restriction is not a continuously measuring device and not accurate to less than 10 p.p.m. of oxygen and quite often not even sensitive below 25 p.p.m. of the oxygen. Also, other impurities tend to interfere with the results of this method. A resistivity meter has been proposed in which slight variations of oxygen concentration will cause detectable changes in the resistivity of the liquid metal, but other impurities have been found to affect the results and furthermore the results have not been found to be reproducible. A technique based on the variation of the corrosion rate of niobium with the oxygen content of the sodium has been suggested but as presently conceived can be used only intermittently and requires considerable time to obtain acceptable results for a particular sample.

It has been proposed that the principle of a galvanic cell be utilized as a means of obtaining a continuously measuring and instantly reading device of the desired accuracy and range. A system incorporating a galvanic cell would have the unique advantage, in theory at least, of increasing in accuracy with decreasing concentration of the oxygen impurity. Theoretical considerations and some basic experimentation have indicated that a galvanic cell can be utilized in this fashion, as described in U.S. Atomic Energy Commission report NYO-7009 entitled, "Measurements of Galvanic Cells Involving Solid Electrolytes," by Kiukkola and Wagner, dated Aug. 15, 1956, and a British report AERE-R3037 by G. W. Horsley. However, workers in the field have up to now been unable to produce a practical arrangement suitable for use with highly corrosive sodium or other alkali metals capable of producing consistent results with a reasonable degree of accuracy in the temperature and concentration ranges required for reactor use.

In accordance with the present invention, a galvanic cell has been successfully produced to accomplish the purposes as stated hereinabove. The cell is of the type described based upon the reaction between the oxygen dissolved in the liquid metal and another metal-metal oxide combination. Two electrodes are combined to form a probe. The first or reference electrode consisting of a metal and its oxide is separated from the liquid alkali metal by a solid electrolyte. The second electrode is simply a contact made of an inert metal whose oxide is easily reduced which is immersed in the liquid alkali metal. The electrolyte is a solid material consisting of $ZrO_2$ with small amounts of CaO added to produce an ionic conductor. In the reference electrode, the metal may be oxidized and the electrons given off traverse the circuit and enter the sodium or other alkali metal through the second electrode to combine ultimately with dissolved oxygen to form oxygen ions which diffuse through to the metal interface to form additional oxide of the metal. The reverse process may also occur.

The cell described above may be represented as follows:

(1) $\quad M, MO/ZrO_2+CaO/Na_2O(Na)$ where M and MO represent a suitable metal and its oxide while $Na_2O(Na)$ represents oxygen dissolved in sodium.

From a generalized point of view, the reaction occurring in the above cell may be described as (2) $\quad M+XNa_2O \rightarrow MO_x+2XNa$ The electrical potential between the reference electrode and the sodium is given by the equation:

(3) $$E = E_o + \frac{RT}{2F} \ln [o]$$

where $E_o$ = the standard potential of the cell in volts
$T$ = the absolute temperature in degrees Kelvin
$R$ = the gas constant;
$F$ = quantity of electricity in faradays; and
[o] is the activity of oxygen (proportional to concentration of oxygen)

The variation of cell EMF with change in oxygen activity is given as follows:

(4) $$\left(\frac{dE}{d}[o]\right) = \frac{0.044T}{[o]} \text{ millivolts}$$

Hence, it is apparent that the voltage change is greatest at low oxygen activity. Calculations based on the mathematics outlined above show that at about 650° F. a voltage change of 0.3 millivolt should be approximately equivalent to a change in 1% of the absolute oxygen content, going from 9.0 to 9.1 p.p.m. of oxygen.

A more detailed mathematical analysis is given in the aforementioned publications.

In accordance with this invention it has been found that a reference electrode consisting of copper-copper oxide will function under certain specified conditions to produce a highly efficient and effective continuous oxygen monitor for sodium.

The arrangement in accordance with this invention as more particularly to be described hereinbelow for the first time produces results which are to be expected and is capable of regular use under reactor operating conditions over extended periods of time.

It is therefore a first object of this invention to provide an electro-chemical method and apparatus for the measurement of the concentration of oxygen in sodium in the range of a few parts per million.

Another object is a method and apparatus for continuously detecting the presence of small amounts of oxygen in certain liquid metals.

Still another object is a method and apparatus for continuously measuring the amount of oxygen activity in molten metals.

A further object of this invention is a method and apparatus for detecting the presence or increase in the oxygen content of liquid metals.

Other objects and advantages of this invention will hereinafter become more evident from the following description of preferred embodiments of this invention taken with reference to the accompanying drawings in which.

Figure 1:
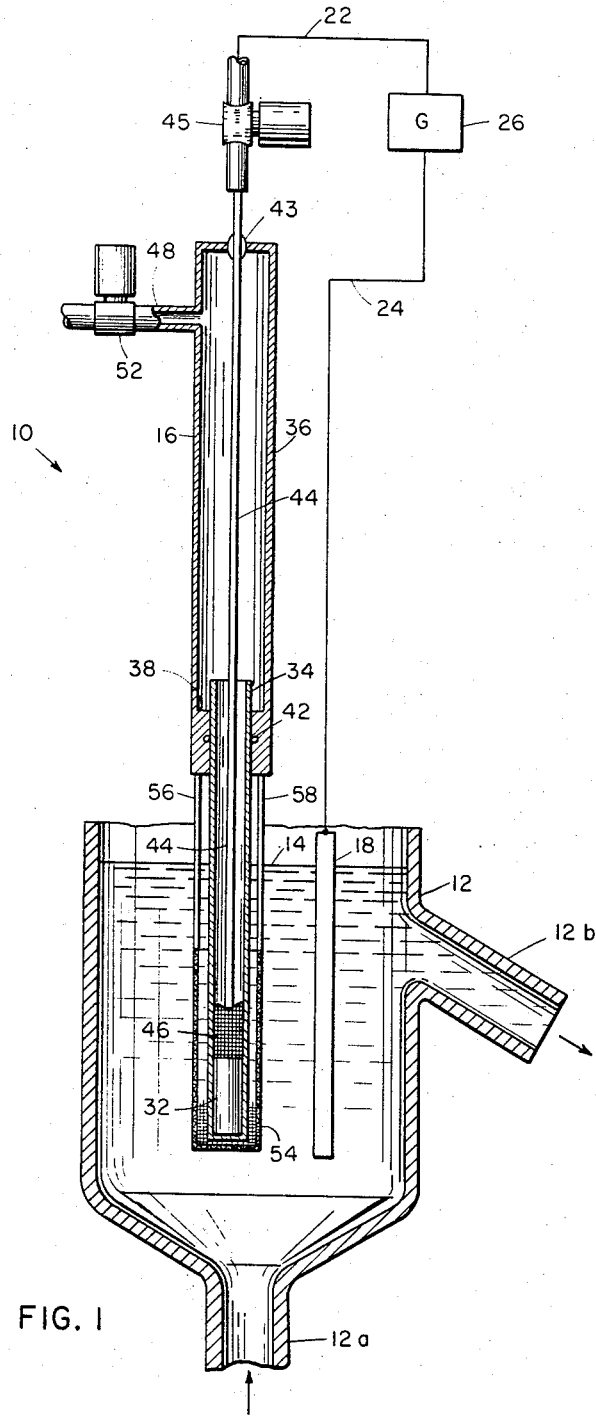
FIG. 1 illustrates a preferred embodiment of this invention.

Referring to FIG. 1 there is shown a galvanic cell 10 consisting of a pot 12 with inlet 12a and outlet 12b containing molten sodium 14, or more specifically, a solution of Na and $Na_2O$, and a probe or electrode assembly 16 and an electrode 18 of a relatively inert metal acting as a conductor immersed in sodium 14. A pair of electrical leads 22 and 24 complete the electrical circuit through sensitive instruments 26, such as a Keithley electrometer together with a potentiometer (not shown)), to measure the EMF developed in cell 10. While not shown it is understood that pot 12 extends up to enclose all of probe 16 so as to permit an inert atmosphere to be maintained above sodium 14.

As is understood in the art, electrometer 26 would be connected through low noise cables to minimize the possibility of electrical leakage. The electrometer 26 is biased with respect to sodium 14 in pot 12 by means of the potentiometer which would be adjusted to give a null reading on electrometer 26. With apparatus as just described the full sensitivity of the instruments can be used to give accurate voltage measurements to within 0.1 millivolt. For the particular embodiment illustrated electrode 18 is simply a contact made of a metal whose oxide is easily reduced, as, for example, iron (Fe) or nickel (Ni).

Electrode assembly 16 consists of the reference electrode 32 which is a pellet or powder of the metal-metal oxide mixture filling the bottom portion of a tube 34 closed at the bottom. Tube 34 is constructed of the solid electrolyte of cell 10 and is supported from a cylindrical casing 36 which may be of stainless steel construction. Tube 36 is cylindrical, closed at the top and has thickened bottom 38 with an opening to accommodate electrolyte tube 34. An O-ring 42 embedded in bottom 38 seals the interior of tube 34 and casing 36 for a purpose to be later described. Extending down into electrolyte tube 34 is a thin hollow conductor rod 44 supported by a clamp 45. Tube 44 is designed to act as an electrical conductor and may be constructed of stainless steel. A ceramic insulated electrical lead-through 43 may be provided where tube 44 passes through the top of casing 36. Above pellet 32 is packed firmly a platinum wire mesh 46 into which conductor rod 44 terminates as illustrated. Conductor tube 44 would be clamped to maintain the tight packing of mesh 46. Mesh 46 insures good electrical contact between the conductor rod 44 and pellet or reference electrode 32.

In order to maintain an inert atmosphere within electrode assembly 16, a pipe connection 48 with a valve 52 is provided leading into casing 36. Completing the arrangement, a mesh basket 54 of suitable material such as nickel is fitted around but spaced from tube 34 in the manner illustrated. Basket 54 is supported by two or more rods 56 and 58 suspended from casing 36. The purpose of the nickel mesh basket 54 is to retain any fragments that might result should tube 34 shatter or chip.

In the operation of the galvanic cell just described, voltmeter 26 measures the potential difference developed in cell 10 and in so doing indicates the concentration of the oxygen dissolved in sodium 14, provided the measuring instrument is properly calibrated.

The electrolyte material making up tube 34 must be of material which conducts electricity primarily by ions rather than electrons. If there were appreciable electronic conduction the voltage of the galvanic cell would be lower than that credited from thermodynamic calculations.

It is also essential for the electrolyte making up tube 34 to be impervious and reasonably inert to the molten metal, in this case sodium. If the electrolyte were porous, the liquid sodium would tend to short out the galvanic cell, and if a reaction did take place between the two materials a reaction layer may be formed which would interfere with the functioning of this electrochemical cell.

The electrolytic material selected for tube 34 is $ZrO_2$ which when pure has too high an impedance for use at the temperature herein described. Therefore, it has been found that the addition of small amounts of oxygen "carriers" is necessary to carry out the invention as described. The $ZrO_2$ is modified, in the preferred embodiment with additions of CaO to cause the former to become an electrolytic conductor, that is, conduct only by oxygen ion motion. The amount of CaO required does not appear to be critical in a narrow range as tests were run at 3.5 wt. percent and 7.5 wt. percent with satisfactory results. But the range of this additive should be written 2 wt. percent and 15 wt. percent.

Regarding reference electrode 32, as was pointed out, this element consists of a mixture of a metal and its oxide. A suitable material for this purpose has been found to be a mixture of copper (Cu) and cuprous oxide ($Cu_2O$). The electrode consisting of this material may be prepared by mixing a finely divided Cu and $Cu_2O$ powders, cold pressing the mixture to form a cylindrical pellet and sintering the pellet in argon. Typical sintering conditions are ½ hr. at 1850° F. Another material of possible use as the primary electrode is Ni-NiO which is prepared in similar fashion to the $Cu-Cu_2O$ electrode. The relative amounts of Cu and $Cu_2O$ which can be used in the reference electrode do not fall within a critical range except that the powders must be intimately mixed to that a separate phase of each exists at the point of contact with the $ZrO_2$ electrolyte. Instead of sintering, the powders may be outgassed at temperatures of 650–1200° F. for 1–2 hours.

The described electrochemical cell functions well with a $Cu-Cu_2O$ electrode as an oxygen monitor in the range of 500 to 650° F. Exceeding this range causes significant reaction between the sodium and zirconium oxide causing unsatisfactory performance while at lower temperatures the impedance of the cell increases materially making measurement more difficult.

The following examples demonstrate the operation of the cell:

Example I

A closed-end tube made of zirconium dioxide ($ZrO_2$) containing 7.5 weight percent calcium oxide (CaO) about ½ inch in diameter and having a wall thickness of about 0.060 inch, was used as the electrolyte. A few grams of copper and cuprous oxide powders in the ratio 1.5 to 1 were blended, placed in the bottom of the tube and evacuated at 1200° F. Contact was made to the mixed powders by means of platinum wire mesh and a stainless steel rod. The inside of the electrode assembly was then filled with pure argon. This assembly was then immersed in the vessel or pot containing sodium at about 550° F. as illustrated in FIG. 1.

Figure 2:
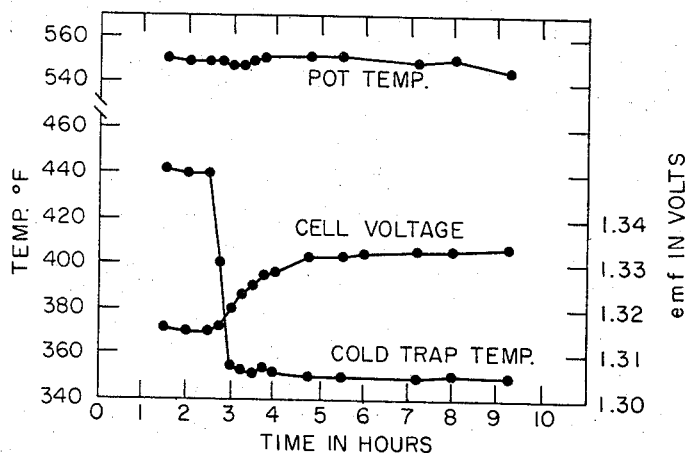
FIGS. 2–4 illustrate experimental data obtained utilizing this invention.

The pot received sodium from a cold-trap held at 440° F., at which temperature the saturation oxygen concentration is about 45 parts per million (p.p.m.). The potential between the internal $Cu-Cu_2O$ internal reference electrode and the sodium was measured by suitable instrumentation and found to be stable at 1.315 volts. The cold-trap temperature was then changed in a period of about 30 minutes to about 350° F., corresponding to an oxygen concentration of about 20 p.p.m. The cell voltage showed an initial response within 15 minutes and reached a constant value of 1.333 volts. Hence, a decrease of about 25 p.p.m. in oxygen content raised the voltage 18 millivolts. The curves in FIG. 2 plot the data taken from this example.

Example II

Figure 3:
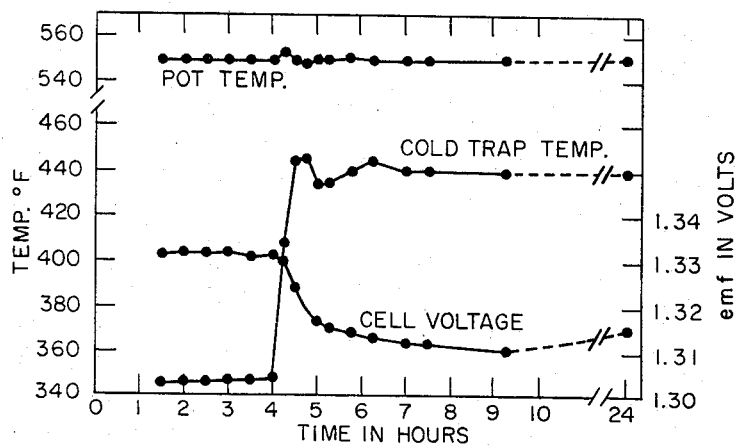

The same cell as in Example I was used except that the cold trap temperature was changed from about 350° F. to 440° F. with the consequent change of oxygen content in the sodium in pot 12 going from 20 p.p.m. to 45 p.p.m. A plot of the data obtained is shown in FIG. 3 demonstrating again the close relationship of oxygen content to cell voltage output and the fact that the cell is reversible as to oxygen content.

Example III

Figure 4:
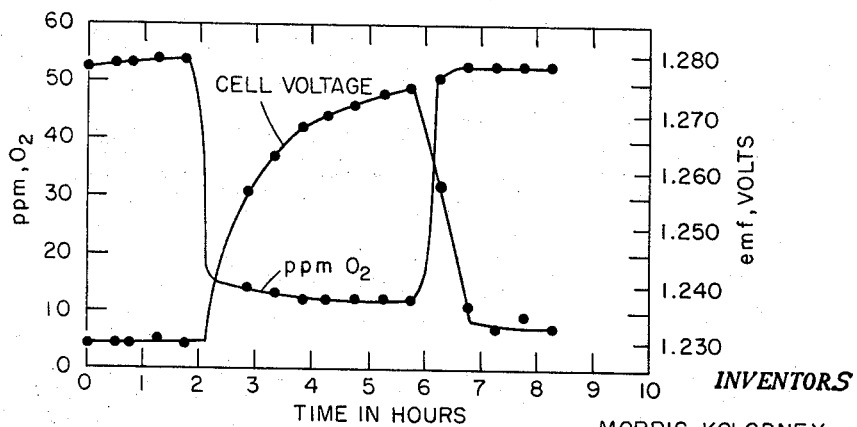

The same cell as in Example I was used except that the solid electrolyte contained 3.5% weight of CaO, and the reference electrode of $Cu-Cu_2O$ was made by cold pressing the mixture of powder and then sintering them at elevated temperatures. This cell was used in sodium at 540° F. The data from this cell is plotted in FIG. 4. It will be observed that within a period of about 5 hours, the oxygen content of the sodium was first abruptly lowered and then raised by adjusting the cold trap temperature accordingly. The cell followed the changes rapidly, returning to nearly its original value.

Example IV

A cell like that of Example I was heated above 650° F. in sodium where the reading deteriorated and became unreliable. Subsequent reduction to 550° F. did not restore the cell's ability to detect oxygen.

Example V

A cell as described in Example I was tested for voltage drift over a long period of time. The sodium contained in the pot was held at 550° F. and the cold trap temperature was held at 350° F., for a period of 10 days. The output of the cell over the whole period dropped off gradually from 1.3390 volts to 1.3369 volts, a total drop of only 2.1 millivolts. This corresponds to a change of 1.1 p.p.m. oxygen at an oxygen level of 12 p.p.m. which at this level is considered to be satisfactory.

Example VI

A cell described in Example I was immersed in sodium at 500 to 600° F. for a total of 1100 hours and was still operating satisfactorily at the end of this period indicating that the device may function for long periods under reactor temperature conditions.

In utilizing the galvanic cell described above, the particular cell would preferably be calibrated in the manner of the tests described in the examples given. Then the sodium inlet to the pot would be transferred to a reactor sodium loop where the device would continue to function, this time indicating the amount of oxygen present in the sodium. However, even without prior calibration the apparatus and method could be used to indicate changes in oxygen activity. Hence, as a safety device it can be incorporated into a nystem to detect quickly sudden or unusual changes in oxygen activity. With regard to the reference composition consisting of $Cu-Cu_2O$ it should be pointed out that experimental evidence indicates that Ni-NiO may be similarly useful.

It is thus seen that there has been provided a unique method for the measurement of the amount of oxygen dissolved in molten sodium. The invention is capable of continuous use and measurement in a system of flowing sodium such as found in a nuclear reactor using sodium as the coolant.

While only preferred embodiments of the invention have been described it is understood that many alterations and modifications thereof may be made without departing from the scope of this invention as defined in the appended claims.

We claim:
1. A galvanic cell for the detection of oxygen dissolved in liquid sodium, comprising,
 (a) an electrode assembly adapted to be immersed in a bath of sodium, said assembly including a hollow body of solid electrolyte of impervious $ZrO_2$ containing oxygen carrier CaO;
 (b) a pellet of Ni-NiO in intimate mixture within said hollow body with separate phases of both the metal and metal oxide in contact with said electrolyte;
 (c) a relatively inert metal electrode adapted to be immersed in said bath spaced from said assembly and
 (d) means for detecting the EMF development between said electrode and said pellet for indicating the presence of oxygen in said molten sodium, the last-named means including a rod conductor extending from said pellet, a wire mesh of highly conductive material providing electrical contact between said pellet and the end of said rod conductor, and means for clamping said rod conductor tightly against said mesh.
2. The galvanic cell of claim 1 in which a porous mesh basket is immersed in said bath spaced from and surrounding said hollow body to retain any fragments of electrolyte in the event of electrolyte damage.
3. A galvanic cell for the detection of oxygen dissolved in liquid sodium, comprising,
 (a) an electrode assembly adapted to be immersed in a bath of sodium, said assembly including a hollow body of solid electrolyte of impervious $ZrO_2$ containing oxygen carrier CaO;
 (b) a pellet of $Cu-Cu_2O$ in intimate mixture within said hollow body with separate phases of both the metal and metal oxide in contact with said electrolyte;
 (c) a relatively inert metal electrode adapted to be immersed in said bath spaced from said assembly; and
 (d) means for detecting the EMF developed between said electrode and said pellet for indicating the presence of oxygen in said molten sodium, the last-named means including a rod conductor extending from said pellet, a wire mesh of highly conductive material providing electrical contact between said pellet and the end of said rod conductor, and means for clamping said rod conductor tightly against said mesh.

References Cited

UNITED STATES PATENTS 3,297,551    1/1967    Alcock _____ 204—195

FOREIGN PATENTS 458,218    12/1936    Great Britain.
851,884    10/1960    Great Britain.

OTHER REFERENCES

Kinkkola et al., "AEC Report NYO," 7009 (1956), also reported at "Electrochemical Society Journal," vol. 104 (1957), pp. 379–386.

Horsley et al., "United Kingdom Atomic Energy Authority AERE–R3037," 1961.

HOWARD S. WILLIAMS, *Primary Examiner.*

JOHN H. MACK, MURRAY TILLMAN, *Examiners.*

T. TUNG, *Assistant Examiner.*